US007118367B2

(12) United States Patent
Hinzpeter et al.

(10) Patent No.: US 7,118,367 B2
(45) Date of Patent: Oct. 10, 2006

(54) ROTOR FOR A TABLET PRESS

(75) Inventors: Jurgen Hinzpeter, Schwarzenbek (DE); Ulrich Zeuschner, Schwarzenbek (DE); Peter Luneburg, Berkenthin (DE); Ulrich Arndt, Lauenburg/Elbe (DE); Hans Wolf, Schwarzenbek (DE); Matthias Rau, Dassendorf (DE)

(73) Assignee: FETTE GmbH, Schwarzenbek (DE)

( * ) Notice: Subject to any disclaimer, the term of this patent is extended or adjusted under 35 U.S.C. 154(b) by 292 days.

(21) Appl. No.: 10/308,256

(22) Filed: Dec. 2, 2002

(65) Prior Publication Data

US 2003/0101843 A1 Jun. 5, 2003

(30) Foreign Application Priority Data

Dec. 1, 2001 (DE) ................................ 101 59 114

(51) Int. Cl.
*B29C 43/08* (2006.01)

(52) U.S. Cl. ...................... 425/193; 425/195; 425/345; 425/353

(58) Field of Classification Search ................ 425/193, 425/195, 345, 353
See application file for complete search history.

(56) References Cited

U.S. PATENT DOCUMENTS

| | | | | |
|---|---|---|---|---|
| 2,166,192 | A * | 7/1939 | Whittemore | 425/345 |
| 5,843,488 | A * | 12/1998 | Korsch et al. | 425/193 |
| 6,471,501 | B1 * | 10/2002 | Shinma et al. | 425/195 |

FOREIGN PATENT DOCUMENTS

| | | | |
|---|---|---|---|
| DE | 225851 | A3 | 7/1985 |
| JP | 10305395 | A | 11/1998 |

* cited by examiner

*Primary Examiner*—Duane Smith
*Assistant Examiner*—Thu Khanh T. Nguyen
(74) *Attorney, Agent, or Firm*—Vidas, Arrett & Steinkraus

(57) ABSTRACT

A rotor for a tablet press including an upper-ram receptacle for the upper rams and a lower-ram guide for the lower rams of the tablet press, as well as a retainer plate having a series of die-bores which are oriented towards the upper and lower rams wherein the retainer plate is composed of at least two ring segments which are adapted to be mounted non-positively and/or positively to the body of the lower-ram guide by means of a fixing device.

4 Claims, 2 Drawing Sheets

ROTOR FOR A TABLET PRESS

The invention relates to a rotor for a tablet press according to the preamble of claim 1.

The rotor of a rotary tablet press typically comprises an upper-ram receptacle, a lower-ram guide, and a retainer plate. In axially parallel bores, the lower-ram guide receives individual lower rams which are oriented towards die-bores of the retainer plate. In axially parallel bores, the upper-ram receptacle receives upper rams which are also oriented towards die-bores. While the rotor is rotating the upper and lower rams interact with appropriate guides or pressure rollers for a compact to be manufactured and ejected. The upper-ram receptacle mostly is a separate component whereas the lower-ram guide and retainer plate are usually defined by an integral body.

The conventional design has been employed hitherto for predominantly all tabletting machines. It is also advantageous inasmuch as dies and the reception bores are "standardized" in the retainer plate for the dies. In the terminology as is used herein, dies are the molding tools which are received, mostly in a sleeve-like manner, in reception bores of the retainer plate. The inside contour of the dies governs the contour of the compact. It is for the above reason that dies, irrespective of the number of stations, the machine manufacturer, the diameter of the graduated circle, etc. may be employed in any tablet press that meets conventional standards. In addition, dies involve relative low expenditure in manufacture.

This fact is opposed by significant disadvantages. The manufacture of a retainer plate involves great expenditure because the die reception bores require to be made to be precise in diameter, depth, and position accuracy. Despite this, dies cannot always be prevented from projecting above the upper side of the retainer plate or are in a lower position. This results in problems in tabletting or even cleaning. Expenditure is large anyway in cleaning the die reception bores and the blind-hole threaded bores for the die bolts. As is known dies require to be located in the reception bores by means of threaded bolts radially screwed into the die disc. In addition, mounting and dismounting the dies requires a relatively large effort. Finally, it is great expenditure and difficult to align the dies with the upper rams.

It is the object of the invention to provide a rotor for a tablet press the aim of which is to considerably reduce the effort in operating the press.

The object is achieved by the features of claim 1.

According to the invention, the retainer plate is composed of at least two ring segments which are adapted to be mounted non-positively and/or positively to the body of the lower-ram guide. Depending on the design type, the die ring segments may also be attached axially to the upper-ram receptacle, radially to the lower-ram guide or axially and radially to the upper-ram receptacle. It is also possible to manufacture the lower-ram guide and upper-ram receptacle as an integral part.

The inventive configuration of the rotor has several advantages. The ring segments may be readily dismounted from the rotor with no need to take out the rotor as a whole. Therefore, cleaning proves to be very easy. It is further simplified by the fact that specific dies are no longer necessary, but molding dies are rather defined directly by the bores in the ring segments. Therefore, the bores for the locking screws of the dies cannot happen to get contaminated.

Another advantage of rapid disassembly and assembly also is that an easy change may be made from the contour of a compact to the next contour. Also here, it is unnecessary to mount and dismount dies because dies need no longer be used for the inventive rotor. What adds to this is the further advantage that more bores may be arranged on a graduated circle than if dies are used. If dies are used the number of dies is restricted by the wall thickness of the dies and the radial blind-hole threaded bores for locating the dies by means of screws.

Since dies are no longer used there are no dies either that project above or below and could interfere with the operation of the press and make cleaning difficult.

The material for the retainer plate, which is still hard chromium-plated in most cases for reasons of wear, has been sure hitherto (e.g. GGG-40, VA cast iron, steel, etc.). Dies may be made, and are made, from different materials (hardened steel, cemented carbide, ceramics, etc.) so that the surface which contacts the product (the upper side of the retainer plate) is composed of differently wear-resistant materials. This is avoided in the die ring segments. The whole surface which contacts the product is always made of one material here.

The die ring segments preferably tighten their upper side axially against a ring surface which matches the level of the actual retainer plate. It is at this level that the dies are filled, the resultant tablets are expelled and led out of the machine via a stripper. This ensures that if the die ring segments are changed the settings of the filling device and tablet stripper need not be changed. This also makes it possible to refinish the upper side of the die ring segments, e.g. in case of wear without changing the level of the die ring segment upper side with respect to the filling device, tablet stripper, etc.

The above description proceeds assumes that at least two ring segments are used. However, a separate single-piece ring is also imaginable which may be fixed to the body of the lower-ram guide by means of appropriate fastening devices mounted thereon. A complete ring naturally requires that the body of the lower-ram guide be somewhat more complicated than is a split ring.

According to an aspect of the invention, the upper and lower sides of the ring segments are plane-parallel. The manufacture of such ring segments proves to be comparatively easy. According to another aspect of the invention, the body of the lower-ram guide has a cylindrical circumferential surface and a planar radial surface with the fixing device having locking means by which to tighten the ring segments against the circumferential and radial surfaces. Preferably, the radial surface faces the bottom so that pressing the ring segments against the radial surface will locate the level of the upper side of the ring segments and retainer plate.

The fixing device may have locking screws which are disposed to be axially parallel and act against the lower side of the ring segments to press them against the radial surface. Alternatively, provision may be made for the use of locking wedges which bear against a slanting area of the ring segments and a slanting area of the body of the lower-ram guide by means of radially disposed locking screws, thus being capable of firmly bracing the ring segments to the body.

The invention will be described in more detail below with reference to the drawings.

Figure 1:
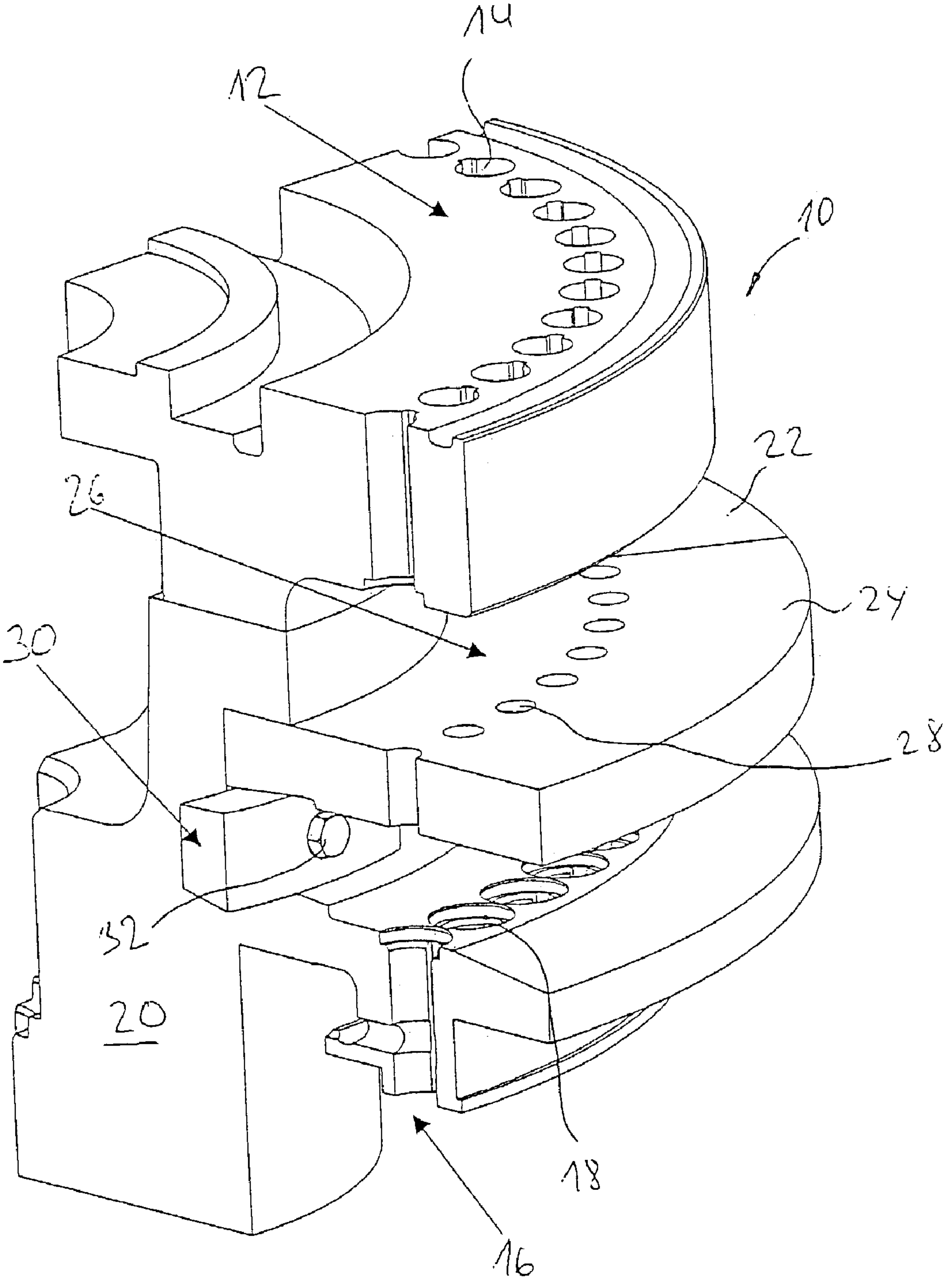
FIG. 1 shows the inventive portion of the rotor in a perspective view.

FIG. 1 allows to recognize a portion of a rotor 10 of a tablet press or tabletting machine. It has an upper-ram receptacle 12 including reception bores 14 for upper rams which are not shown. It further has a lower-ram guide 16 including reception bores 18 for lower rams which are not shown. The lower-ram guide 16 forms part of a body 20. The body 20 and upper-ram receptacle 12 are separate components and are braced against each other via radial surfaces which, however, is not illustrated in detail and is known as such.

Furthermore, FIG. 1 shows two ring segments 22, 24 which define a retainer plate 26, along with more ring segments. The ring segments 22, 24 have bores 28 disposed on a graduated circle which are interacted with by the upper and lower rams, which are not shown, for the manufacture of tablets or compacts. Thus, the contour of the compacts is determined by the contour of the bores 28.

Finally, FIG. 1 allows to recognize a locking wedge 30 to fix the ring segment 24 to the body 20 by means of a locking screw 32. The way the ring segments are fixed is more evident from FIGS. 2 and 3.

Figure 3:
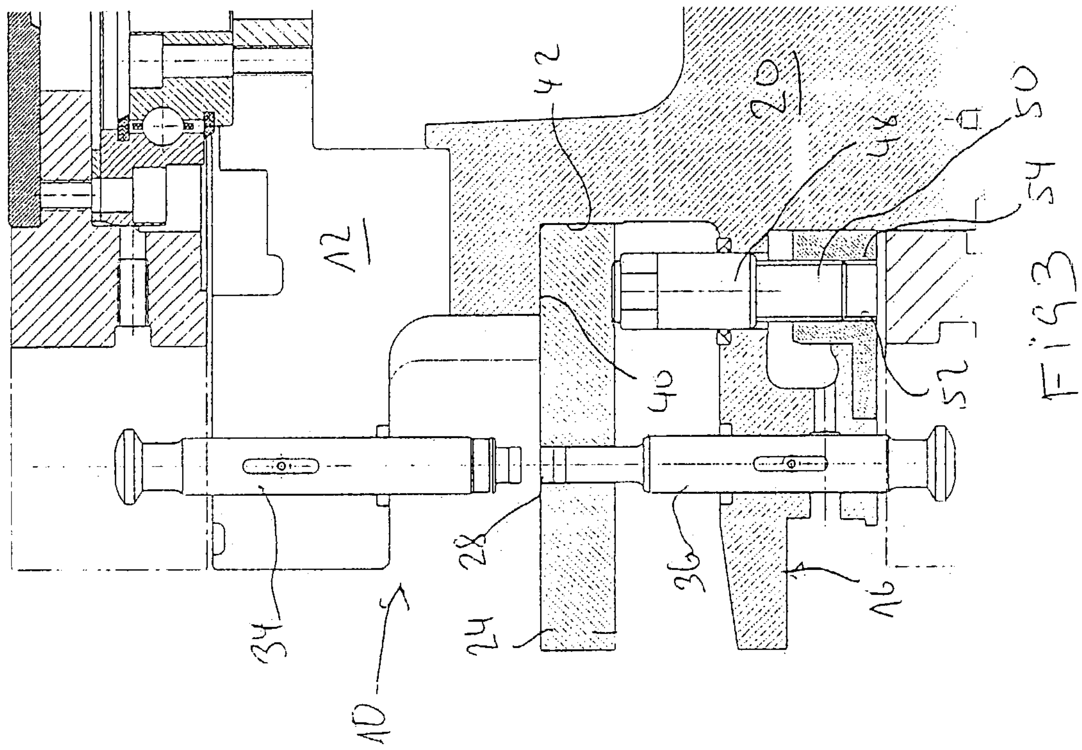
FIG. 3 shows an alternative option to fix ring segments.
Figure 2:
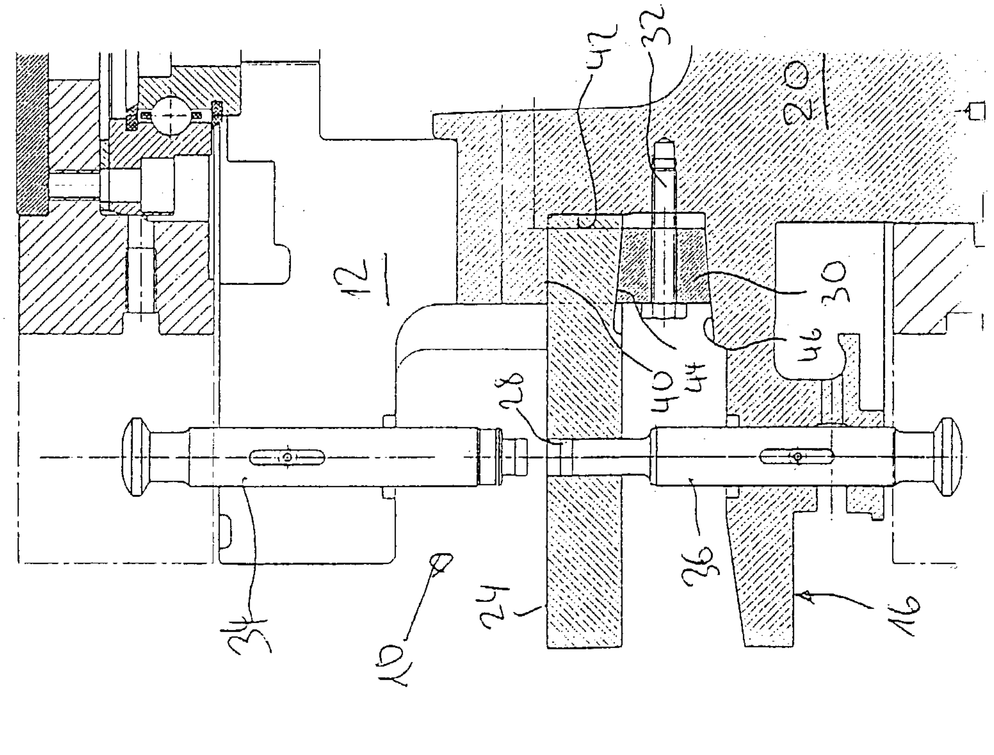
FIG. 2 shows a radial section through the representation of FIG. 1.

Since the general structure is equal in FIGS. 2 and 3 identical parts are denoted by the same reference numbers as in FIG. 1.

Furthermore, FIGS. 2 and 3 illustrate one upper ram 34 and one lower ram 36 each. The structure and function of the rams 34, 36 will not be discussed because this is generally included in the state of the art. Nor is there an intention to discuss the remaining components of the tabletting machine of FIGS. 2 and 3. It should merely be noted that the rotor 10, as a whole, is rotated by an appropriate drive about a vertical axis so that the rams 34, 36 perform upward and downward motions to produce a compact in the bores 28.

As can be seen in FIGS. 2 and 3 that the body 20 has a radial surface 40 which faces downwards and a cylindrical circumferential surface 42 which is disposed at right angles thereto. The surfaces 40, 42 serve for precisely locating the ring segments 22, 24. To mount the ring segments, there is a wedge shown in FIG. 2 which interacts with a downwardly facing slanting area 44 of the ring segments and an upwardly facing slanting area 46 of the body 20 by being radially pressed inwardly by means of the radial locking screw 32. In this way, the ring segments are firmly tightened against the surfaces 40, 42 and, thus, are given their precise positions.

In the embodiment of FIG. 3, the body 20 has provided therein bolts 48 at uniform circumferential spacings that abut against the lower side of the ring segments and are seated by threaded portions 50 in threaded bores 52 of a ring 54 firmly joined to the body 20. The bolt which is shown also allows to firmly brace the ring segments against the surfaces 40, 42.

The invention claimed is:

1. A rotor for a tablet press including an upper punch, a receptacle body for the upper punches, a lower punch guide for lower punches of the tablet press, provided at a body member (20) of the rotor, ends die-plate having a series of die-bores which are aligned with the upper and lower punches, the die-plate being composed of at least two ring segments (22, 24) adapted to be attached non-positively and/or positively to the body (20) of the lower punch guide (16) by means of a fixing device, the body (20) of the lower-ram guide (16) having a cylindrical circumferential surface (42) ends planar radial surface (40), and the fixing device having locking means by which the ring segments (22, 24) are tightened against the circumferential and radial surface (42 40), die bores being formed solely by bores in the ring segments (22,24), the upper and lower punches and the ring segments are designed such that the upper and lower punches directly interact with the bores (28) of the ring segments (22,24).

2. The rotor as claimed in claim 1, characterized in that the upper and lower sides of the ring segments (22,24) are defined by plane-parallel surfaces.

3. The rotor as claimed in claim 1, characterized in that axially parallel threaded bores of the body (20) which are spaced at a circumferential spacing have disposed therein locking screws (48) which act against the ring segments (22, 24) from the bottom.

4. The rotor as claimed in claim 1, characterized in that the ring segments (22,24) have a slanting area (44) radially inwardly at the lower side and the body (20) has another slanting area (46) below the slanting area (44) and locking wedges (30) are provided for the ring segments (22,24) that are adapted to be radially screwed into threaded bores of the body (20) and are radially locked towards the inside while accommodating the associated ring segment (22,24) against the radial and circumferential surface (40, 42) of the body (20).

* * * * *